(12) United States Patent
Chinuki et al.

(10) Patent No.: US 7,896,299 B2
(45) Date of Patent: Mar. 1, 2011

(54) SUPPORT STAND (75) Inventors: Motonari Chinuki, Chiba (JP); Gen Minagi, Tokyo (JP); Maiko Kawarai, Tokyo (JP); Yoshihiko Kato, Chiba (JP); Kazunori Sukeda, Tokyo (JP)

(73) Assignee: The Bank of Tokyo-Mitsubishi UFJ, Ltd., Tokyo (JP)

( * ) Notice: Subject to any disclaimer, the term of this patent is extended or adjusted under 35 U.S.C. 154(b) by 0 days.

(21) Appl. No.: 12/171,578

(22) Filed: Jul. 11, 2008

(65) Prior Publication Data
US 2009/0159762 A1 Jun. 25, 2009

(30) Foreign Application Priority Data
Dec. 19, 2007 (JP) .............................. 2007-327838

(51) Int. Cl.
*A47K 1/04* (2006.01)
(52) U.S. Cl. ....................................... 248/129; 248/127
(58) Field of Classification Search ................. 248/129, 248/127, 188.7, 188.8, 218.4, 163.1, 431
See application file for complete search history.

(56) References Cited
U.S. PATENT DOCUMENTS

| 5,448,464 | A * | 9/1995 | Moss | .......................... 362/401 |
| 2003/0196975 | A1 * | 10/2003 | Murray et al. | ........... 211/126.2 |
| 2008/0283692 | A1 * | 11/2008 | Leinen | ...................... 248/125.8 |
| 2009/0146027 | A1 * | 6/2009 | Zitting et al. | ............. 248/176.1 |

FOREIGN PATENT DOCUMENTS

| JP | 63-113199 | 7/1988 |
| JP | 08-069342 | 3/1996 |
| JP | 2006-030913 | 2/2006 |
| JP | 2004-229051 | 7/2008 |

* cited by examiner

*Primary Examiner*—Amy J Sterling
(74) *Attorney, Agent, or Firm*—Harness, Dickey & Pierce, PLC (57) ABSTRACT

A support stand includes a base 2 including a substantially rectangular base plate 3 and four support feet 5 provided on the base plate 3 to extend outward from corners of the base plate in diagonal directions, respectively, and a stay 15 built vertically on the base 2 and for supporting the support target 30. One support foot 5b out of the four support feet 5 is formed to be bent into an L shape in a plan view or formed into an inverted U shape in a side view, and the support feet 5a adjacent to the one foot 5b are formed to extend linearly.

4 Claims, 7 Drawing Sheets

SUPPORT STAND

BACKGROUND OF THE INVENTION

1. Field of the Invention

The present invention relates to a support stand supporting a support target of various types such as a panel display device, e.g., a liquid crystal monitor. More specifically, the present invention relates to a support stand effective to arrange two support targets back to back.

2. Description of the Related Art

As an example of a support stand supporting a support target of various types, a support stand supporting a panel display device that can be used in a teleconference system of various types using a network is disclosed in, for example, Japanese Patent Application Laid-Open No. 2004-229051.

The support stand includes a foot part formed crisscross, a stay built vertically on central portion of the upper side of the foot part, and casters provided at a plurality of locations on under side of the foot part. A panel display device is attached to an upper end of the stay.

To hold a teleconference held by participants at remote places using display devices configured as stated above, long tables are arranged each at a predetermined position in a room or the like, the participants are seated on near side of the long tables, and display devices are arranged on farther sides of the long tables to correspond to the participants respectively, for example. Each participant thereby participates in the teleconference while looking at contents displayed on a display screen of his or her individual display device.

Meanwhile, the support stand supporting the display device configured as stated above has the stay built on the central portion of the foot and the display device attached to the upper end of the stay. Due to the configuration, when a plurality of display devices are disposed in a narrow place such as a room having a limited space, the foot parts of the support stands corresponding to the respective display devices interfere with one another. As a result, the display devices cannot be disposed closely to one another, resulting in an increase in installation space.

Moreover, if the display devices are accommodated in a corner of a room or the like when they are not used, a plurality of display devices cannot be put in the small place because of the interference of the feet of the support stands with one another. Therefore, a wide space is necessary to accommodate a plurality of display devices.

SUMMARY OF THE INVENTION

To solve the conventional problems, it is an object of the present invention to provide a support stand allowing a plurality of support targets to be disposed in a narrow space and to be accommodated in the narrow space.

To solve the above problem, an aspect of the present invention is a support stand supporting a support target, including: abase including a base plate and a plurality of support feet provided on the base plate to protrude outward from the base plate; and a stay built vertically on the base, and for supporting the support target, wherein one of the plurality of support feet is formed to include a concave portion in which a support foot of other support stand can be accommodated when the support stand is arranged to be adjacent to the other support stand.

According to the support stand of the aspect of the present invention, when a support stand supporting one support target and a support stand supporting other support target are arranged to be adjacent to each other, a support foot of the support stand supporting the other support target can be accommodated in the concave portion of one support foot of the support stand supporting the one support target. Accordingly, the support stand supporting the one support target and the support stand supporting the other support target can be arranged to be close to each other, thereby making it possible to arrange or accommodate a plurality of support targets in a small space.

According to the aspect of the present invention, the one support foot may be formed to be bent into an L shape, the support feet adjacent to the one support foot may be formed to extend linearly, and a support foot of the other support stand may be accommodated in the concave portion formed by a bent portion of the one support foot of the support stand.

By so configuring, when a support stand supporting the one support target and a support stand supporting the other support target are arranged to be adjacent to each other, the support foot, formed to extend linearly, of the support stand supporting the other support target can be accommodated in the concave portion of the one of the support foot, formed to be bent into the L shape, of the support stand supporting the one support target. Accordingly, the support stand supporting the one support target and the support stand supporting the other support target can be arranged to be close to each other, thereby making it possible to arrange or accommodate a plurality of support targets in a small space.

Another aspect of the present invention is a support stand supporting a support target, including: a base including a substantially rectangular base plate and four support feet provided on the base plate to extend outward from corners of the base plate in diagonal directions, respectively; and a stay built vertically on the base, and for supporting the support target, wherein one foot of the four support feet is formed to be bent into an L shape in a plan view or formed into an inverted U shape in a side view, and the support feet adjacent to the one foot are formed to extend linearly.

According to the support stand of the aspect of the present invention, when a support stand supporting the one support target and a support stand supporting the other support target are arranged to be adjacent to each other, the support foot, formed to extend linearly, of the support stand supporting the other support target can be accommodated in the concave portion of one support foot, formed to be bent into an L shape in a plan view or formed into an inverted U shape in a side view, of the support stand supporting the one support target.

Accordingly, the support stand supporting the one support target and the support stand supporting the other support target can be arranged close to each other, thereby making it possible to arrange or accommodate a plurality of support targets in a small space.

According to the present invention, the support target is, for example, a display device.

In this case, if a support stand supporting one display device and a support stand supporting other display device are arranged to be adjacent to each other, the support foot of the support stand supporting the other display device can be accommodated in the concave portion of the support foot of the support stand supporting the one display device. Accordingly, the support stand supporting the one display device and the support stand supporting the other display device can be arranged close to each other, thereby making it possible to arrange or accommodate a plurality of display devices in a small space.

DESCRIPTION OF THE PREFERRED EMBODIMENTS

An embodiment of the present invention will be described hereinafter with reference to the accompanying drawings.

A support stand 1 according to the present invention is applicable to support various support targets. In the embodiment, a panel display device 30 such as a liquid crystal monitor is a support target. The support stand 1 is applied in the case of holding a teleconference between groups of large numbers of people using display devices 30.

As shown in FIGS. 1 to 5, the support stand 1 according to the embodiment includes a base 2 revolvable and movable in longitudinal and horizontal directions on a floor surface of a room or the like, a stay 15 built vertically on an upper surface of the base 2, an attachment unit 19 formed integrally on a top of the stay 15, and a supporting means 21 attached to the attachment unit 19, wherein the display device 30 is attached to the supporting means 21.

Figure 1:
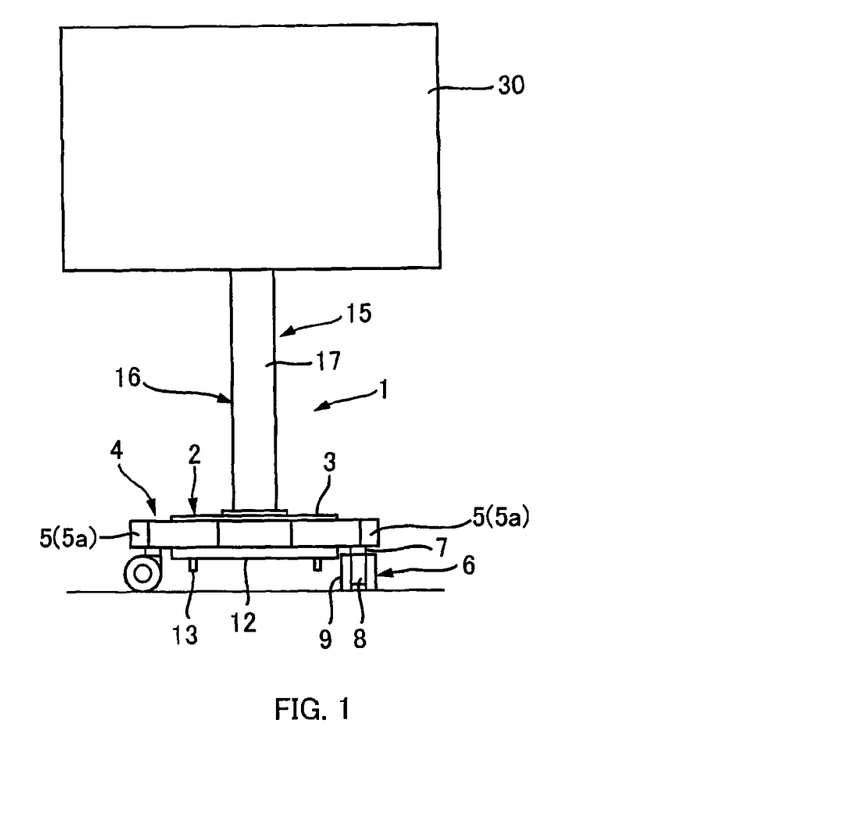
FIG. 1 is a front view showing an overall configuration of a support stand according to an embodiment of the present invention.
Figure 2:
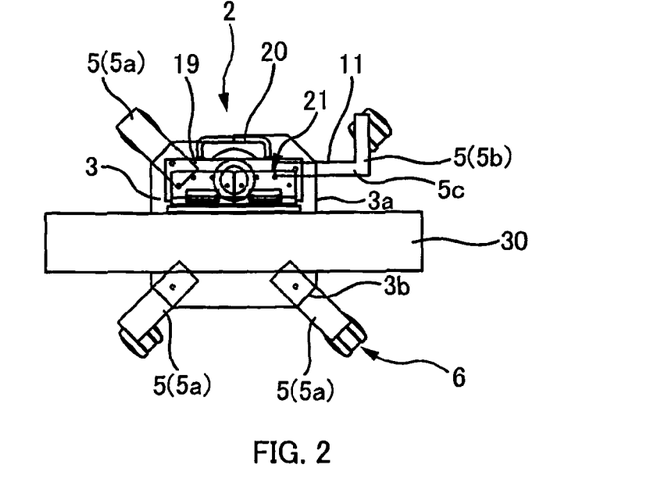
FIG. 2 is a plan view of FIG. 1.
Figure 3:
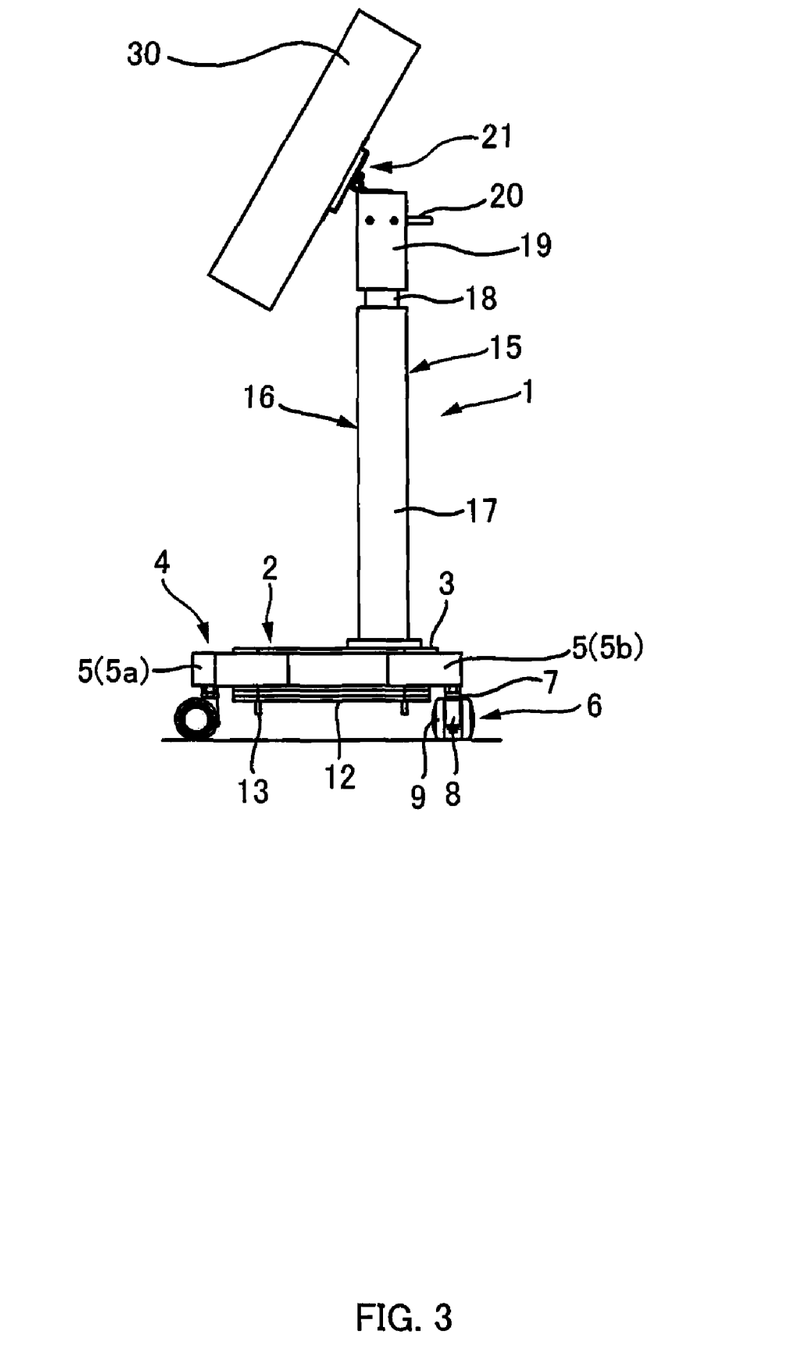
FIG. 3 is a side view of FIG. 1, showing a state in which a display device is inclined at about 45 degrees.

As shown in FIGS. 1 to 3, the base 2 is configured to include a base plate 3 in the form of rectangular plate, a foot part 4 provided on an under surface of the base plate 3, casters 6 attached on an under surface of the foot part 4, and a deadweight 12 detachably attached on the under surface of the base plate 3 wherein the stay 15 is built vertically on an upper surface of the base plate 3. The base 2 is formed to be smaller lengthwise and crosswise in dimension than a width of a display screen of the display device 30.

As shown in FIG. 2, the foot part 4 includes four support feet 5 attached integrally to four corners of the under surface of the base plate 3 by welding or the like, respectively. One caster 6 is attached on an under surface of a tip end of each support foot 5 so as to be rollable and revolvable. These casters 6 enable the base 2, the stay 15 built on the base 2, and the display device 30 attached to the stay 15 via the supporting means 21 to be integrally revolvable and movable in the longitudinal and horizontal directions on a floor surface of a room or the like.

Among the four support feet 5 of the foot part 4, three support feet 5 (hereinafter, "I-shaped support feet 5a") are made of square pipes or the like and formed linearly. Rear ends of the three I-shaped support feet 5a are connected integrally on the under surface of the base plate 3 by welding or the like in a manner that the I-shaped support feet 5a extend in diagonal directions of the base plate 3 so that almost all parts of the I-shaped support feet 5a except for the rear ends protrude radially outward from corners 3b of the baseplate 3, respectively. Further, the casters 6 are attached on under surfaces of the tip ends of the I-shaped support feet 5a respectively to be rollable and revolvable.

As shown in FIG. 2, the other support foot 5 (hereinafter, "L-shaped support foot 5b") among the four support feet 5 of the foot part 4 is made of a square pipe or the like and has an L shape in plan view. A rear end of the L-shaped support foot 5b is connected integrally on the under surface of the base plate 3 by welding or the like in a manner that almost all part of the L-shaped support foot 5b except for the rear end protrudes outward from one side 3a of the base plate 3, a rear end of a bent portion 5c protruding from the base plate 3 is orthogonal to the side 3a of the base plate 3, and a tip end of the bent portion 5c is parallel to the side 3a of the base plate 3. Further, one caster 6 is attached on a under surface of the tip end of the L-shaped support foot 5b so as to be rollable and revolvable. In this case, the L-shaped support foot 5b is attached to the base plate 3 in a manner that a part of the L-shaped support foot 5b to which the caster 6 is attached is located on a diagonal line of the base plate 3.

The casters 6 of the I-shaped support feet 5a and that of the L-shaped support foot 5b are attached on the under surfaces of the tip ends of the I-shaped support feet 5a and L-shaped support foot 5b, respectively in a manner that the casters 6 are arranged concentrically about a center of the base plate 3. By so configuring, the base 2, the stay 15 built vertically on the base 2, and the display device 30 attached to the top of the stay 15 via the supporting means 21 can be supported to be smoothly revolvable and movable in the longitudinal and horizontal directions.

The casters 6 are commercially available casters. As shown in FIGS. 1 and 3, each of the casters 6 includes a caster base 7 fixed to the under surface of the tip end of each of the I-shaped support feet Sa and the L-shaped support foot 5b by a screw (not shown), a caster support 8 provided on the under side of the caster base 7 so as to be revolvable, an axle (not shown) a center of which is supported by the caster support 8, and a wheel 9 supported on the axle rotatably via a bearing (not shown). The wheel 9 rotates about the axle and revolves to follow revolution of the caster support 8, whereby the base 2, the stay 15, and the display device 30 move integrally on the floor surface in the longitudinal and horizontal directions or revolve on the floor surface.

It is to be noted that the casters 6 are not limited to those configured as stated above but can be the commercially available casters of various types.

As shown in FIG. 2, according to the configuration of the L-shaped support foot 5b as stated above, a concave portion 11 of a desired shape (of a trapezoidal shape in the embodiment) is formed on an inner part of the bent portion 5c of the L-shaped support foot 5b protruding outward from the base plate 3 and the L-shaped support foot 5b is configured in a manner that the I-shaped support feet 5a of the foot part 4 of the support stand 1 supporting another display unit 30 can be accommodated in the concave portion 11.

The deadweight 12 is, for example, a plate deadweight made of a metal material such as lead and having a uniform density. As shown in FIGS. 1 and 3, the deadweight 12 is detachably attached to a central portion of the under surface of the base plate 3 by a screw 13. By adding a weight of the deadweight 12 to the under surface of the base plate 3, a weight of the base 2 can be increased and a position of the center of gravity of the entire support stand 1 including the display device 30 can be moved downward and thus stability of the base 2 is improved. It is thereby possible to stably support the display device 30 on the upper side of the base 2 via the stay 15 and possible to form each of the L-shaped support foot 5b and the I-shaped support feet 5a of the foot part 4 to be short.

Moreover, since the deadweight 12 is attached to the under surface of the base plate 3 using a space formed on the under surface side of the base plate 3, by increasing or decreasing the number of deadweights 12 according to the weight, the position of the center of gravity or the like of the display device 30 to be used, the base 2 can stably support the display device 30 of various types different in weight, position of the center of gravity and the like.

As shown in FIG. 3, the stay 15 is built vertically at a position displaced from the center of the base plate 3 in a backward direction of the display screen of the display device 30 (rightward in FIG. 3). The attachment unit 19 is attached integrally to the top of the stay 15 and the display device 30 is attached to the attachment unit 19 via the supporting means 21.

The reason for building the stay 15 at the position displaced from the center of the base plate 3 in the backward direction of the display screen of the display device 30 is to make the anterior length of the base 2 larger than a posterior length thereof to the stay 15. By providing the stay 15 at such a position, when a teleconference is held using a long table, for example, the anterior part of the base 2 can be placed under a long table and thus an amount of a part of the base 2 protruding out of the long table can be made small.

As shown in FIGS. 1 and 2, the stay 15 includes a vertically expandable height adjustment mechanism 16. By vertically expanding or contracting the stay 15 using the height adjustment mechanism 16, a vertical position of the display device 30 attached to the attachment unit 19 on the top of the stay 15 via the supporting means 21 can be adjusted.

In the embodiment, as shown in FIGS. 1 and 2, a commercially available air suspension including a cylinder main body 17 and a rod 18 reciprocably provided in the cylinder main body 17 is used as the stay 15 that includes the height adjustment mechanism 16. A lower end of the cylinder mainbody 17 of this air suspension is fixed to the upper side of the base plate 3 by a screw (not shown), the attachment unit 19 of a box shape is provided integrally on an upper end of the rod 18, and the display device 30 is attached to the upper side of the attachment unit 19 via the supporting means 21.

Here, the attachment unit 19 is not limited to be a box shape but may be formed in any other shape such as a plate shape. As shown in FIG. 3, a grip 20 of an inverted U shape is formed integrally on a rear surface (a right-side surface in FIG. 3) of the attachment unit 19 to protrude therefrom. By moving the rod 18 vertically with this grip 20 held by the hand, the position of the display device 30 can be adjusted to a position corresponding to the vertical position of the rod 18.

A lock mechanism (not shown) is provided between the cylinder main body 17 and the rod 18 to fix the rod 18 at a vertically predetermined position. By fixing the rod 18 using the lock mechanism, the display device 30 attached to the rod 18 via the attachment unit 19 can be fixed at a arbitrary vertical position. The stay 15 is not limited to the air suspension but may be an arbitrary component as long as the component includes the vertically expandable height adjustment mechanism 16.

Figure 4:
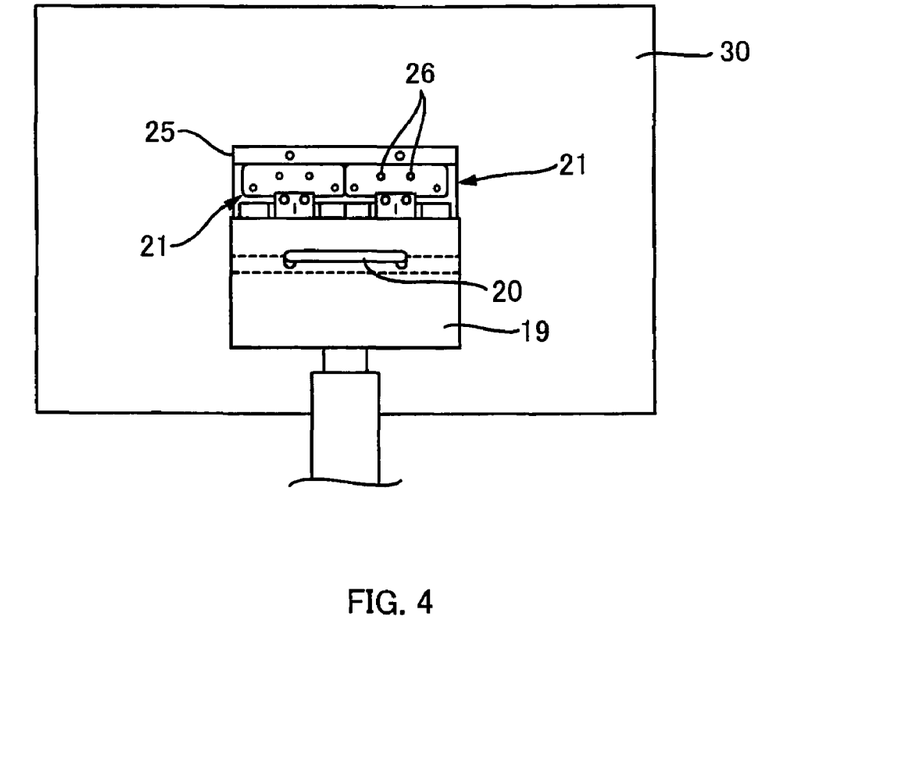
FIG. 4 is an enlarged view of a rear side of the display device.
Figure 5:
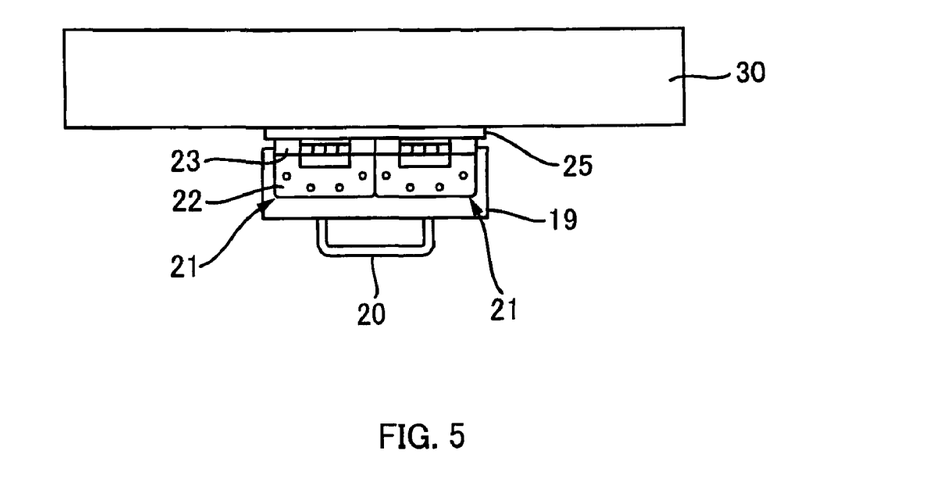
FIG. 5 is a plan view of FIG. 4.

As shown in FIGS. 4 and 5, the supporting means 21 is a hinge 21 including two window splines 22 and 23 each of a rectangular plate shape, a sleeve provided integrally on edges of major sides of the respective window splines 22 and 23, and a connection rod connecting the sleeves of the window splines 22 and 23 to be rotatable with respect to each other, wherein the supporting means 21 is configured so that the both window splines 22 and 23 can swing to each other around the connection rod in a predetermined angle range.

As described later, as the hinge 21, a hinge adjusted so that a rotary torque necessary for the window splines 22 and 23 to swing is higher than a maximum torque of the display device 30 is used.

In the embodiment, as shown in FIGS. 4 and 5, the two hinges 21 are aligned in series and arranged in the upper side of the attachment unit 19, one window spline 22 of each of the hinges 21 is fixed to the upper side of the attachment unit 19 by screws 26, and the other window spline 23 thereof is fixed to a central portion of a rear surface of the display device 30 by the screws 26 via a plate 25. By so configuring, the display device 30 swings integrally with the other window splines 23 of the hinges 21 above the attachment unit 19 whereby, the display device 30 can be configured to be swingable between a position at which the display screen directs upward (the other window splines 23 close) and a position at which the display screen is directed horizontally (the other window splines 23 open substantially at right angle with respect to the window splines 22, respectively) and to be angle-adjustable at an arbitrary position.

By configuring the display device 30 angle-adjustable in the above-stated range, if, for example, the display device 30 is arranged on the farther side of the long table, the base 2 is placed under the long table, and the stay 15 abuts on an edge on the farther side of the long table, then the display device 30 can be projected largely forward of the long table on the upper surface of the long table, and thus the display screen of the display device 30 can be located close to the participants of the teleconference seated at near side of the long table. As the hinges 21, a hinge having a higher torque than a rotary torque acting on the hinge 21 by a self weight of the display device 30 at an arbitrary position when the display device 30 is angle-adjusted to the arbitrary position is used so as to securely hold the display device 30 at the arbitrary position. Namely, since the position at which the rotary torque acting on the hinge 21 reaches the maximum torque is the position at which the display screen of the display device 30 is directed horizontally, the hinge 21 having the higher torque than the rotary torque acting on the display device 30 at the position is selected and used. By using the hinges 21 each having such a torque, it is possible to ensure holding the display device 30 at the arbitrary position.

In the embodiment, a 24-inch liquid crystal monitor having a weight of nine kilograms, for example, is used as the display device 30. By measuring the rotary torque of this display device 30, the maximum the rotary torque of about 6.95 N-m is obtained at the position at which the display screen of the display device 30 is directed horizontally. Therefore, the hinges 21 having the higher torque (about 9.2 N-m) than this rotary torque are selected and used.

In the embodiment, the two hinges 21 each having the torque of about 4.6 N-m arranged in series are used. Alternatively, one or three or more hinges 21 may be used and configured to secure the torque of 9.2 N-m.

Figure 6:
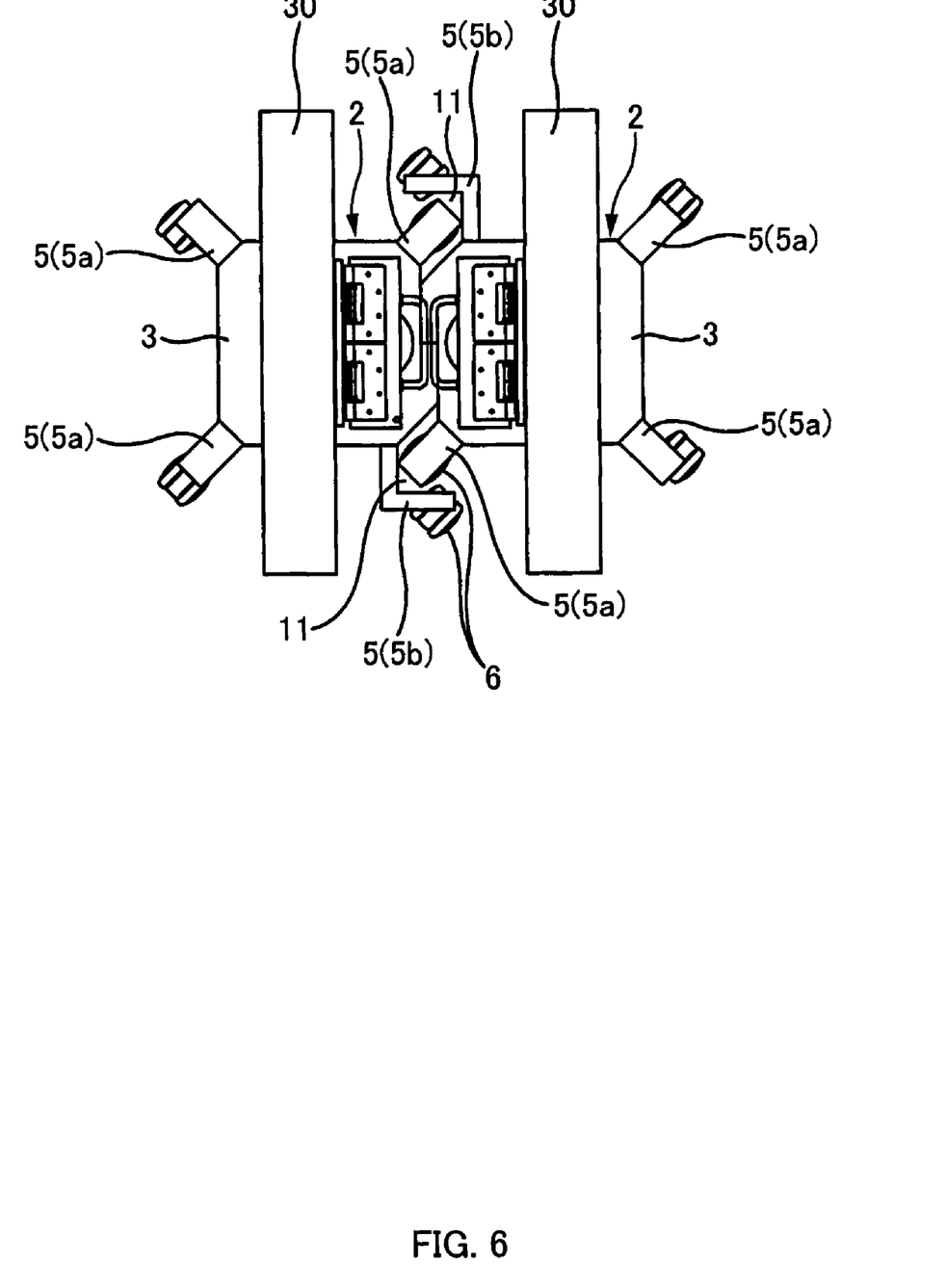
FIG. 6 is a plan view showing a state in which two display devices are arranged back to back.
Figure 7:
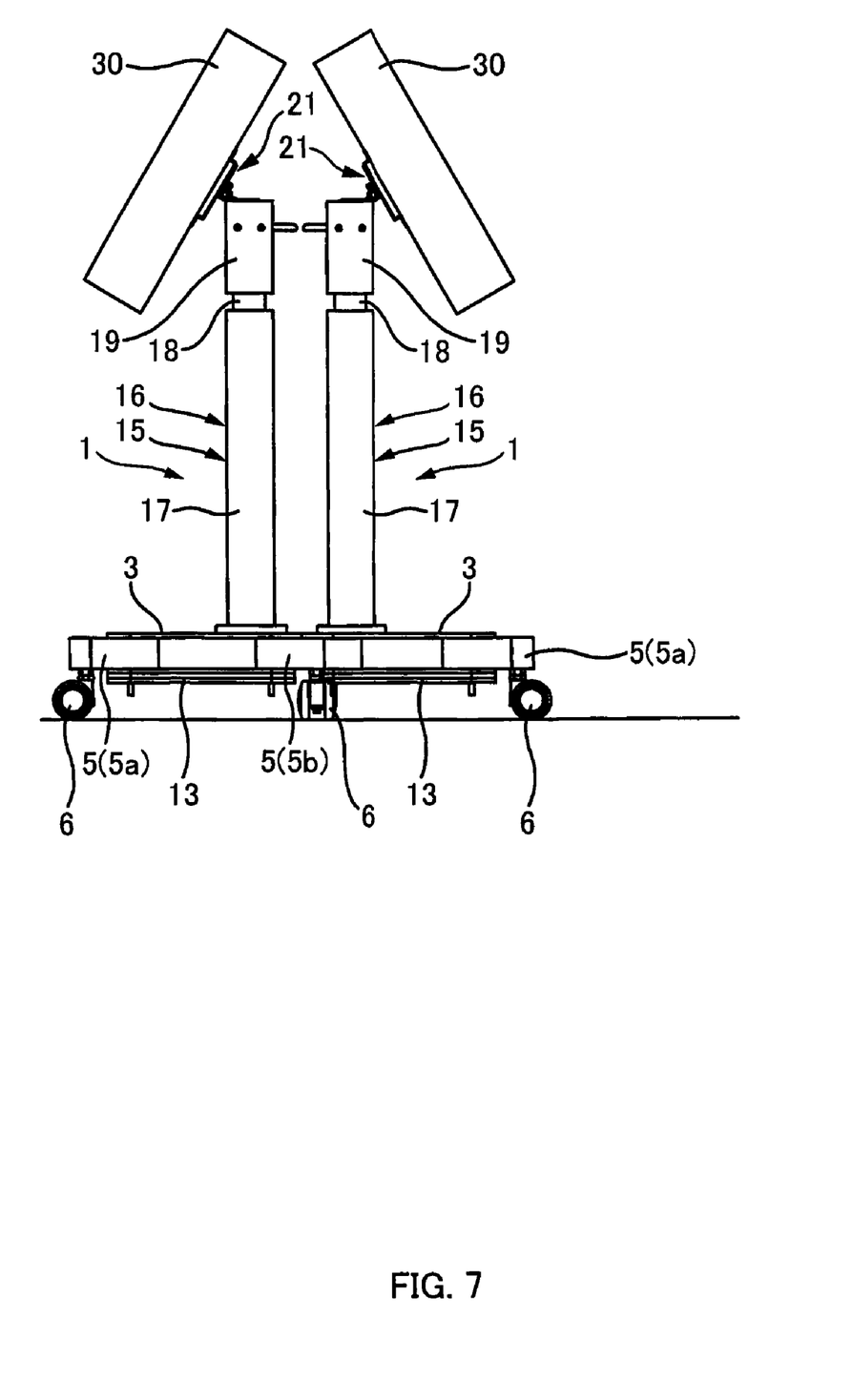
FIG. 7 is a side view of FIG. 6, showing a state in which the display devices are inclined at about 45 degrees.

When a teleconference held among participants at remote places using the display devices 30 each attached to the support stand 1 according to the embodiment configured as stated above, to arrange a plurality of display devices 30 in a narrow place having a limited space such as a room, for example, as shown in FIGS. 6 and 7, two display devices 30 are paired, both display devices 30, 30 are arranged back to back, the support stands 1 of the respective display devices 30 are made closer to each other, one of the I-shaped support feet Sa on the base 2 of one support stand 1 is accommodated in the concave portion 11 on the inner part of the bent portion Sc of the L-shaped support foot 5b on the base 2 of the other support stand 1, and one of the I-shaped support foot 5a on the base 2 of the other support stand 1 is accommodated in the concave portion 11 on the inner part of the bent portion Sc of the L-shaped support foot 5b on the base 2 of one support stand 1 so that end surfaces of the base plates 3 of the bases 2 contact closely to each other.

By doing so, the bases 2 of the two support stands 1 can be combined to be capable of moving or revolving integrally on the floor surface in the longitudinal and horizontal directions, and thus the two display devices 30 supported by the two support stands 1 can be arranged at a predetermined positions, in an integrated state. Moreover, the display devices 30 supported by the two support stands 1 can be inclined at a maximum of about 45 degrees while the two support stands 1 are integrated with each other and thus, the teleconference can proceed smoothly without a problem that it is difficult for the participants of the teleconference to look at the display screens of the both display devices 30.

Therefore, even in the narrow place having the limited space, the two support stands 1 can be placed at desired positions without interference of the support feet 5 of the foot parts 4 of the support stands 1, and the teleconference can proceed smoothly while the participants look at the two display devices 30, 30 supported by the respective support stands 1, respectively.

Moreover, when the two display devices 30 are not used, the display devices 30 can be accommodated in the combined state as shown in FIG. 6 and thus, a plurality of display devices 30 can be accommodated in the narrow space such as the corner of the room, thereby the space required for accommodation can be greatly reduced. Besides, when the two display devices 30 are taken out from or put in to the accommodation place, the display devices 30 can be taken out or put in as a pair, thus facilitating take-out and put-in operations.

Figure 8:
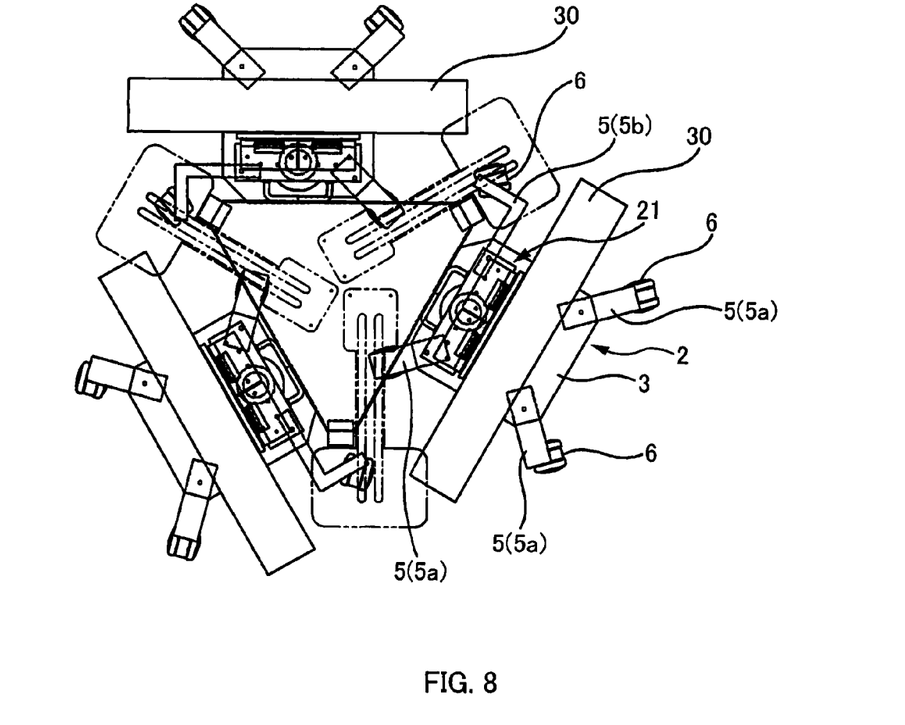
FIG. 8 is a plan view showing another example of arrangement of display devices.

On the other hand, if a wide place without limitation to space is available, the participants are placed in a circle and each of the display devices 30 is arranged between the two adjacent participants as shown in FIG. 8. The teleconference can thereby proceed smoothly while the participants of the teleconference look at the display screens of the display devices 30 on the left and right of the respective participants.

Figure 9:
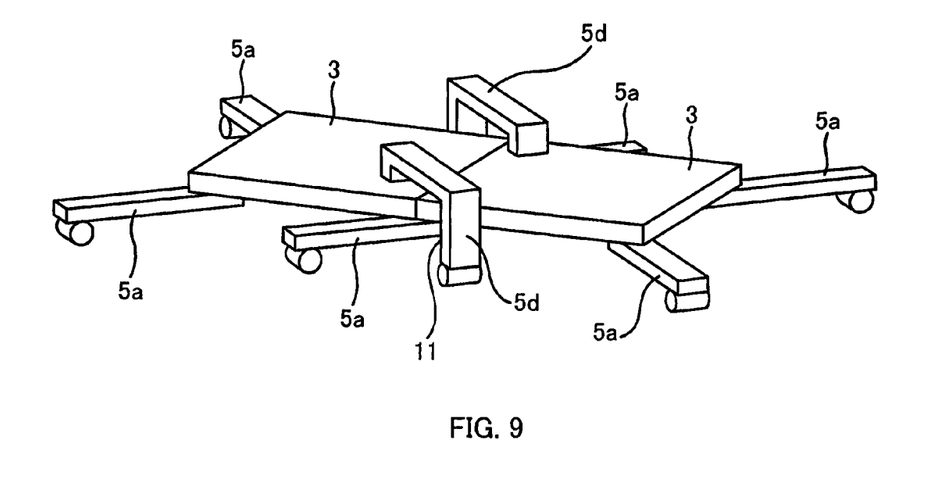
FIG. 9 is a schematic diagram showing a modification of support feet.

FIG. 9 shows a frame diagram of a modification of the support stand 1 according to the embodiment of the present invention.

The support stand 1 shown in FIG. 9 is configured so that one support foot 5d out of the four support feet 5 is formed into an inverted U shape in a side view, and so that the I-shaped support foot 5a of a support stand 1 supporting a counterpart display device 30 are accommodated in the concave portion 11 formed by the bent portion 5c of this U-shaped support foot 5d of one support stand 1 and the configurations of other parts are similar to those according to the preceding embodiment.

Also according to the modification, similarly to the preceding embodiment, even in the narrow place having the limited space, the two support stands 1 can be placed at desired positions without interference of the support feet 5 of the foot parts 4 of the support stands 1, and the teleconference can proceed smoothly while the participants look at the two display devices 30, 30 supported by the respective support stands 1, respectively.

Moreover, when the two display devices 30 are not used, the display devices 30 can be accommodated in the combined state and thus, a plurality of display devices 30 can be accommodated in the narrow space such as the corner of the room, thereby the space required for accommodation can be greatly reduced. Besides, when the two display devices 30 are taken out from or put in to the accommodation place, the display devices 30 can be taken out or put in as a pair, thus facilitating take-out and put-in operations.

In the embodiment or the modification, three out of the four support feet 5 are formed to extend linearly and the other one support foot 5 is formed into the L shape in a plan view or into the inverted U shape in a side view. Alternatively, the three support feet 5 may be formed into shapes other than that extending linearly and the other one support foot 5 may be formed into the L shape or the inverted U shape. In short, it suffices that the four support feet 5 are formed so that, when the two support stands 1 supporting the two display devise 30 are located to be close to each other, the support foot 5 on the base 2 of one support stand 1 can be accommodated in the concave portion on the inner part of the bent portion 5c of the support foot 5 on the base 2 of the other support stand 1, the support foot 5 on the base 2 of the other support stand 1 can be accommodated in the concave portion on the inner part of the bent portion 5c of the support foot 5 on the base 2 of one support stand 1, and so that the end surfaces of the bases plates 3, 3 of the two support bases 2 contact closely to each other.

Figure 10:
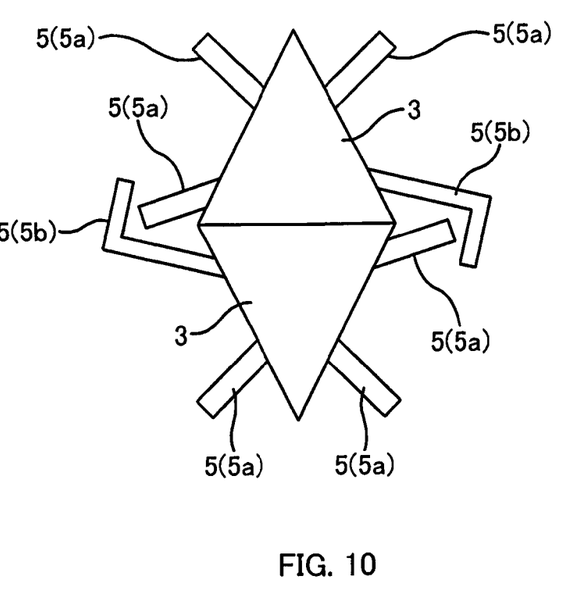
FIG. 10 is a schematic diagram showing a modification of a base plate.
Figure 11:
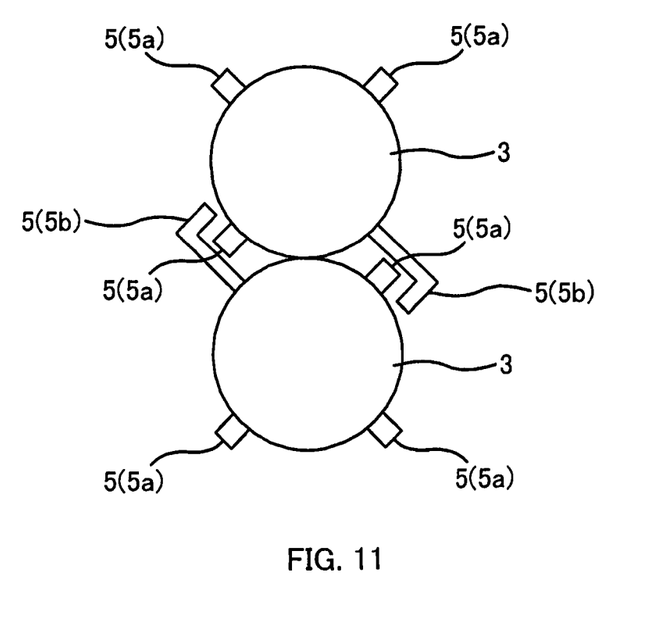
FIG. 11 is a schematic diagram showing a modification of the base plate.

Furthermore, in the above description, the base plate 3 of the base 2 is formed into the rectangular shape. Alternatively, the base plate 3 may be formed into other shapes such as a triangular plate shape or a circular shape. FIG. 10 shows a modification in which a base plate 3 is formed into triangular shape, and FIG. 11 shows a modification in which a base plate 3 is formed into the circular shape. Even these modifications can exhibit the same functions and advantages as those of the above-described embodiment.

Moreover, in the above description, the present invention is applied to the support stand 1 including the four support feet 5. Alternatively, the present invention may be applied to a support stand including three support feet or five or more support feet. Even in such alternative, the same functions and advantages as those of the above-described embodiment can be exhibited.

Further, in the above description, the hinge 21 is used as a supporting means 21 for adjusting the angle of the display device 30. However, the supporting means 21 is not limited to the hinge but an arbitrary unit can be used as the supporting means 21 as long as the unit can function to adjust the display device 30 to have a predetermined angle and to hold the display device 30 at the position.

In the above description, the stay 15 including the height adjustment mechanism 16 is used. Alternatively, a stay that does not include the height adjustment mechanism 16 may be used.

Furthermore, in the above description, the support target is the display device 30. However, the support target is not limited to the display device 30 but maybe another support target such as an article of furniture. In this case, the same functions and advantages as those of the embodiment can be exhibited.

What is claimed is:

1. A support stand supporting a panel display, comprising:
a base including a base plate and a plurality of support feet provided on the base plate to protrude outward from the base plate,
wherein each of the plurality of support feet makes only one contact point with ground; and
a stay built vertically on the base, and for supporting the panel display,
wherein only one of the plurality of support feet is formed to include a concave portion in which a support foot which does not include a concave portion of other support stand can be accommodated when the support stand is arranged to be adjacent to the other support stand, and
wherein the support stand supports the panel display in a predetermined orientation relative to the base, and wherein two of the support feet protrude backward of the panel display and only one of said two support feet includes the concave portion.

2. The support stand according to claim 1, wherein the only one support foot is formed to be bent into an L shape, the support feet adjacent to the one support foot are formed to extend linearly, and a support foot formed to extend linearly of the other support stand are accommodated in the concave portion formed by a bent portion of the only one support foot of the support stand.

3. The support stand according to claim 1, wherein the support target is a display device.

4. The support stand according to claim 2, wherein the support target is a display device.

* * * * *